(12) United States Patent
Kodaira

(10) Patent No.: US 11,681,129 B2
(45) Date of Patent: Jun. 20, 2023

(54) ZOOM LENS, LENS APPARATUS, AND IMAGE PICKUP APPARATUS

(71) Applicant: CANON KABUSHIKI KAISHA, Tokyo (JP)

(72) Inventor: Masakazu Kodaira, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 268 days.

(21) Appl. No.: 17/007,045

(22) Filed: Aug. 31, 2020

(65) Prior Publication Data

US 2021/0063711 A1 Mar. 4, 2021

(30) Foreign Application Priority Data

Sep. 4, 2019 (JP) .............................. JP2019-161212

(51) Int. Cl.
*G02B 15/177* (2006.01)
*G02B 15/167* (2006.01)
*G02B 13/18* (2006.01)

(52) U.S. Cl.
CPC .......... *G02B 15/177* (2013.01); *G02B 13/18* (2013.01); *G02B 15/167* (2013.01)

(58) Field of Classification Search
CPC ...... G02B 5/005; G02B 15/177; G02B 13/18; G02B 15/167; G02B 15/14; G02B 15/142; G02B 15/1425; G02B 9/04; G02B 13/009; G02B 13/04
USPC ....... 359/676, 682, 683, 691, 740, 753, 793; 348/240.99, 240.1–240.3
See application file for complete search history.

(56) References Cited

U.S. PATENT DOCUMENTS

| | | | | |
|---|---|---|---|---|
| 4,998,808 A | * | 3/1991 | Shibayama | G02B 15/142 359/692 |
| 5,353,163 A | * | 10/1994 | Shibayama | G02B 15/1421 359/795 |
| 5,381,268 A | * | 1/1995 | Sato | G02B 15/177 359/691 |
| 5,563,739 A | * | 10/1996 | Sato | G02B 15/1425 359/691 |

(Continued)

FOREIGN PATENT DOCUMENTS

| | | | | |
|---|---|---|---|---|
| CN | 103477265 A | * | 12/2013 | ............. G02B 13/04 |
| CN | 104423023 A | | 3/2015 | |

(Continued)

OTHER PUBLICATIONS

Notification of the First Office Action issued by the China National Intellectual Property Administration dated Jul. 14, 2022 in corresponding CN Patent Application No. 202010914588.7, with English translation.

(Continued)

*Primary Examiner* — Mohammed A Hasan
(74) *Attorney, Agent, or Firm* — Carter, DeLuca & Farrell LLP

(57) ABSTRACT

A zoom lens includes, in order from an object side to an image side, a first lens unit having a negative refractive power and a second lens unit having a positive refractive power. A distance between the first lens unit and the second lens unit changes during zooming. The second lens unit includes an aperture stop and two or more negative lenses. The zoom lens satisfies specified conditional expressions.

13 Claims, 10 Drawing Sheets

(56) References Cited

U.S. PATENT DOCUMENTS

| | | | | |
|---|---|---|---|---|
| 5,661,606 A * | 8/1997 | Sato | ............... | G02B 15/177 359/708 |
| 5,715,097 A * | 2/1998 | Shibayama | ............... | G02B 15/143503 359/689 |
| 5,760,958 A * | 6/1998 | Shibayama | ............... | G03G 15/2064 359/557 |
| 6,441,967 B2 * | 8/2002 | Furuta | ............... | G02B 15/177 359/691 |
| 6,452,730 B2 * | 9/2002 | Sato | ............... | G02B 15/177 359/691 |
| 6,487,024 B2 * | 11/2002 | Sato | ............... | G02B 15/142 359/691 |
| 7,403,341 B2 * | 7/2008 | Watanabe | ............... | G02B 15/143507 359/691 |
| 7,542,215 B2 * | 6/2009 | Muratani | ............... | G02B 15/1425 359/708 |
| 7,599,127 B2 * | 10/2009 | Muratani | ............... | G02B 15/1425 359/691 |
| 7,636,202 B2 * | 12/2009 | Watanabe | ............... | G02B 15/143507 359/691 |
| 7,982,965 B2 * | 7/2011 | Muratani | ............... | G02B 13/06 359/691 |
| 8,125,712 B2 * | 2/2012 | Muratani | ............... | G02B 27/646 359/557 |
| 8,369,021 B2 * | 2/2013 | Muratani | ............... | G02B 15/177 359/691 |
| 8,456,751 B2 * | 6/2013 | Okumura | ............... | G02B 15/143507 359/691 |
| 8,830,592 B2 * | 9/2014 | Sato | ............... | G02B 15/177 359/754 |
| 9,134,516 B2 * | 9/2015 | Kimura | ............... | G02B 15/177 |
| 9,354,430 B2 * | 5/2016 | Sato | ............... | G02B 1/11 |
| 9,588,323 B2 | 3/2017 | Tatenuma et al. | | |
| 9,958,656 B2 * | 5/2018 | Kawamura | ............... | G02B 15/1425 |
| 10,095,012 B2 * | 10/2018 | Yamagami | ............... | G02B 27/646 |
| 10,120,171 B2 * | 11/2018 | Yamasaki | ............... | G02B 13/04 |
| 10,295,803 B2 | 5/2019 | Sakamoto et al. | | |
| 10,409,042 B2 | 9/2019 | Kodaira | | |
| 10,551,600 B2 | 2/2020 | Kodaira | | |
| 2001/0003492 A1 * | 6/2001 | Sato | ............... | G02B 15/177 359/691 |
| 2001/0030812 A1 * | 10/2001 | Furuta | ............... | G02B 15/177 359/676 |
| 2001/0046090 A1 * | 11/2001 | Sato | ............... | G02B 15/1425 359/691 |
| 2007/0070518 A1 * | 3/2007 | Muratani | ............... | G02B 15/1425 359/680 |
| 2008/0106802 A1 * | 5/2008 | Muratani | ............... | G02B 15/1425 359/691 |
| 2008/0198463 A1 * | 8/2008 | Muratani | ............... | G02B 27/646 359/557 |
| 2008/0291548 A1 * | 11/2008 | Watanabe | ............... | G02B 15/143507 359/691 |
| 2010/0195214 A1 * | 8/2010 | Muratani | ............... | G02B 13/06 359/682 |
| 2010/0246028 A1 | 9/2010 | Wei | | |
| 2011/0134537 A1 * | 6/2011 | Muratani | ............... | G02B 15/177 359/680 |
| 2011/0317278 A1 * | 12/2011 | Sato | ............... | G02B 1/11 359/682 |
| 2012/0008036 A1 * | 1/2012 | Uchida | ............... | G02B 15/143505 359/680 |
| 2012/0013996 A1 * | 1/2012 | Okumura | ............... | G02B 13/06 359/691 |
| 2012/0218646 A1 * | 8/2012 | Kimura | ............... | G02B 15/177 359/691 |
| 2013/0329305 A1 | 12/2013 | Kunugise | | |
| 2014/0300781 A1 * | 10/2014 | Yamasaki | ............... | H04N 5/23296 359/694 |
| 2014/0355129 A1 * | 12/2014 | Sato | ............... | G02B 15/177 359/680 |
| 2015/0116819 A1 | 4/2015 | Wei | | |
| 2015/0153549 A1 * | 6/2015 | Muratani | ............... | G02B 13/009 359/691 |
| 2015/0212305 A1 * | 7/2015 | Inoue | ............... | G02B 13/04 359/680 |
| 2016/0124199 A1 | 5/2016 | Sanjo et al. | | |
| 2016/0266360 A1 * | 9/2016 | Yamasaki | ............... | G02B 13/04 |
| 2016/0334609 A1 * | 11/2016 | Lee | ............... | G02B 15/1425 |
| 2017/0068079 A1 * | 3/2017 | Kawamura | ............... | G02B 15/1425 |
| 2018/0373003 A1 | 12/2018 | Liu et al. | | |
| 2019/0113722 A1 | 4/2019 | Kodaira et al. | | |
| 2019/0212525 A1 | 7/2019 | Abe et al. | | |

FOREIGN PATENT DOCUMENTS

| | | | | |
|---|---|---|---|---|
| CN | 106154523 A | | 11/2016 | |
| CN | 106249390 A | | 12/2016 | |
| CN | 104423023 B | * | 8/2017 | ............ G02B 13/04 |
| JP | H0713078 A | * | 1/1995 | ........ G02B 15/1421 |
| JP | 2001-281545 A | | 10/2001 | |
| JP | 2008-310133 A | | 12/2008 | |
| JP | 2009-230122 A | | 10/2009 | |
| JP | 2010-230895 A | | 10/2010 | |
| JP | 2011-242517 A | | 12/2011 | |
| JP | 2014228733 A | | 12/2014 | |
| JP | 2015-082068 A | | 4/2015 | |
| JP | 2017037164 A | | 2/2017 | |
| JP | 2019-132919 A | | 8/2019 | |
| JP | 2019-132920 A | | 8/2019 | |
| NO | 2012/117720 A1 | | 9/2012 | |

OTHER PUBLICATIONS

Japanese Office Action issued in corresponding JP Patent Application No. 2019-161212, dated May 2, 2023, with English translation.

* cited by examiner

ZOOM LENS, LENS APPARATUS, AND IMAGE PICKUP APPARATUS

BACKGROUND OF THE INVENTION

Field of the Invention

The present invention relates to a zoom lens and an image pickup apparatus.

Description of the Related Art

Zoom lenses used for image pickup apparatuses each including an image sensor (image pickup element), such as a surveillance camera, a digital camera, and a video camera, are demanded for high optical performances corresponding to a high definition of the image sensor. In addition, the zoom lenses used for the surveillance cameras are required to be compact for easy installations and unnoticeable appearances. The zoom lenses used for the surveillance camera are also required to be suitable for imaging in a bright (small F-number) environment and in a wavelength range including a near infrared range so as to capture an image in a dark place.

Japanese Patent Laid-Open No. ("JP") 2009-230122 discloses a two-unit zoom lens that includes a negative lens unit and a positive lens unit in order from an object side to an image side. The zoom lens disclosed in JP 2009-230122 has a relatively small F-number and a chromatic aberration corrected in the wavelength range including the near infrared range, but is insufficient in terms of compactness.

SUMMARY OF THE INVENTION

One aspect of embodiments provides, for example, a zoom lens beneficial in compactness, a large aperture, and a high optical performance in a wavelength range from a visible light wavelength to a near infrared light wavelength.

A zoom lens according to one aspect of the present invention includes, in order from an object side to an image side, a first lens unit having a negative refractive power and a second lens unit having a positive refractive power, a distance between the first lens unit and the second lens unit changing during zooming. The second lens unit includes an aperture stop and two or more negative lenses. Following conditional expressions are satisfied:

$$-1.00 < f1/f2 < -0.60$$

$$18 < vd2n < 39$$

$$0.10 < M2/TLw < 0.28$$

$$0.40 < bfwt/f2 < 0.90$$

where f1 is a focal length of the first lens unit, f2 is a focal length of the second lens unit, vd2n is an average of the smallest Abbe number and the second smallest Abbe number in the two or more negative lenses, M2 is a moving amount of the second lens unit during zooming from a wide-angle end to a telephoto end, TLw is an overall length of the zoom lens at the wide-angle end, and bfwt is the shortest air-converted backfocus during zooming from the wide-angle end to the telephoto end.

A lens apparatus and an image pickup apparatus including the above zoom lens also constitute another aspect of the present invention.

Further features of the present invention will become apparent from the following description of exemplary embodiments with reference to the attached drawings.

DESCRIPTION OF THE EMBODIMENTS

Referring now to the accompanying drawings, a description will be given of embodiments according to the present invention.

A zoom lens for achieving the purpose of the present invention includes two lens units, or a lens unit having a negative refractive power and a lens unit having a positive refractive power in order from an object side to an image side.

Each example according to the present invention (FIGS. 1, 3, 5, and 7) is directed to a zoom lens having a two-unit configuration including a first lens unit L1 having a negative refractive power and a second lens L2 unit having a positive refractive power in order from the object side to the image side.

In lens cross-sectional views (FIGS. 1, 3, 5, and 7) according to each example, both the first lens unit L1 and the second lens unit L2 independently move during zooming (magnification varying).

SP represents an aperture stop (diaphragm) and is located on the object side of the second lens unit L2. G represents an optical block corresponding to an optical filter, a face plate, a low-pass filter, an infrared cut filter, or the like. IP represents an image plane. The image plane IP corresponds to an imaging plane of a solid-state image sensor (photo-electric conversion element) such as a CCD sensor or a CMOS sensor when a zoom lens is used for an image pickup optical system in a video camera or a digital camera. When a zoom lens is used for an imaging optical system of a film-based camera, it corresponds to a film plane. Arrows indicate moving trajectories of the respective lens units during zooming (magnification varying) from the wide-angle end to the telephoto end.

In the aberration diagrams of each example (FIGS. 2A to 2C, 4A to 4C, 6A to 6C, 8A to 8C), d (solid line), g (alternate long and two short dashes line), and t (alternate long and short dash line) represent d-line, g-line, and t-line, respectively. Spherical aberrations for the d-line, g-line, and t-line are displayed. M (dotted line) and S (solid line) represent a meridional image plane and a sagittal image plane, respectively. Astigmatisms of M and S for the d-line and distortion for the d-line are also displayed. Lateral chromatic aberrations for the g-line and the t-line are displayed relative to the d-line.

Figure 1:
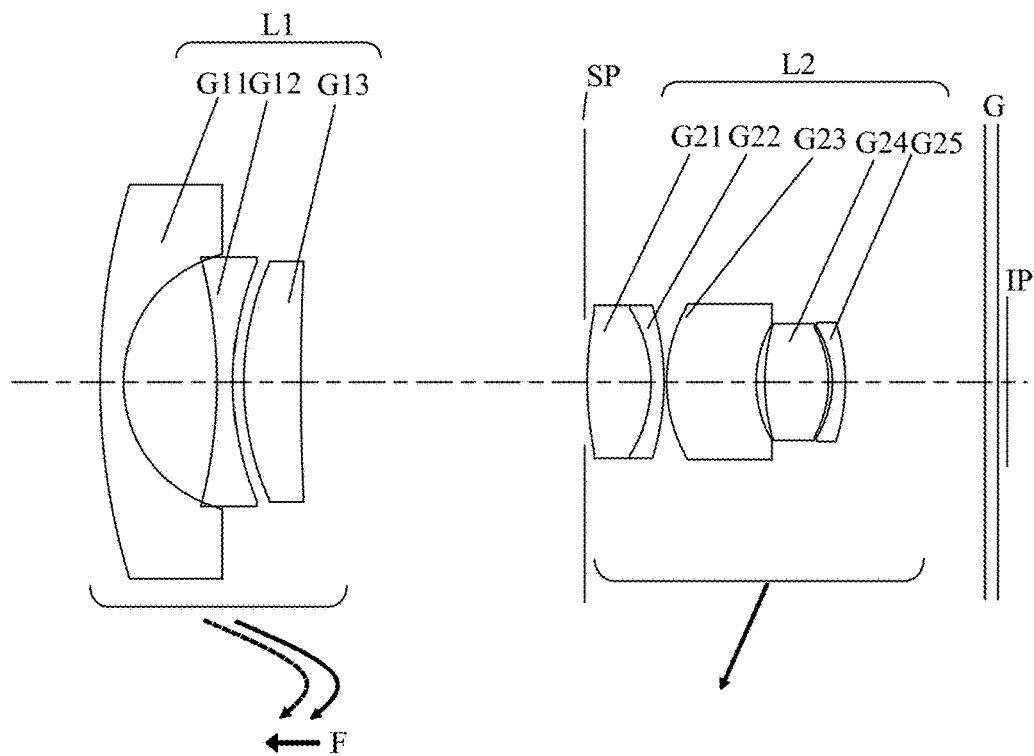
FIG. 1 illustrates a lens cross section and moving trajectories at a wide-angle end of a zoom lens according to Example 1.
Figure 2A:
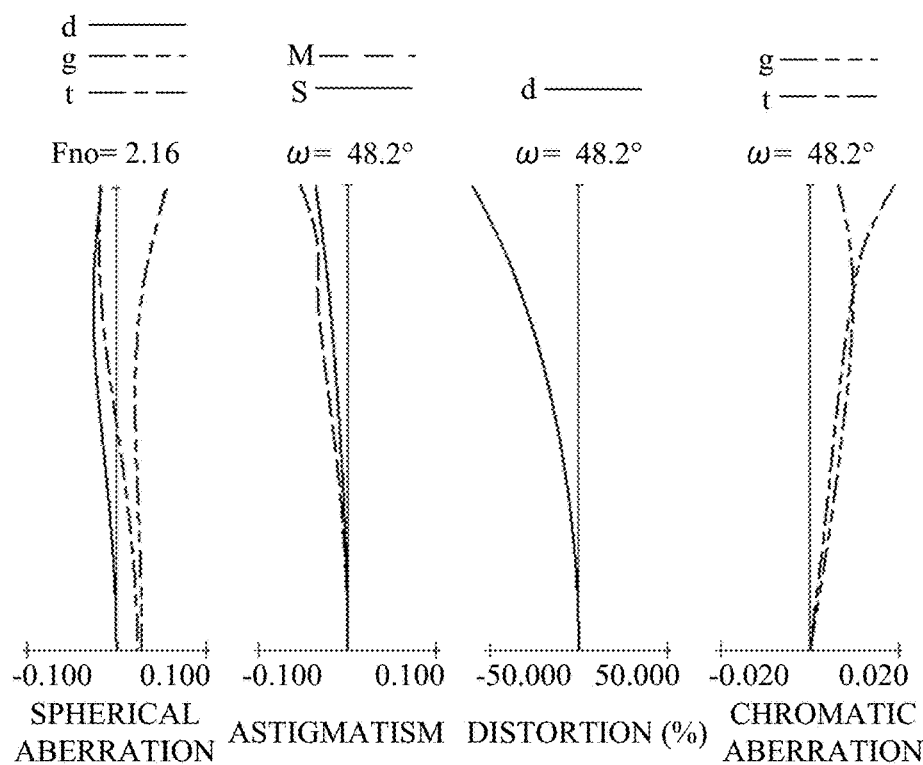
FIGS. 2A to 2C are various aberration diagrams of the zoom lens according to Example 1 at the wide-angle end, a zoom middle position, and a telephoto end, respectively.
Figure 2B:
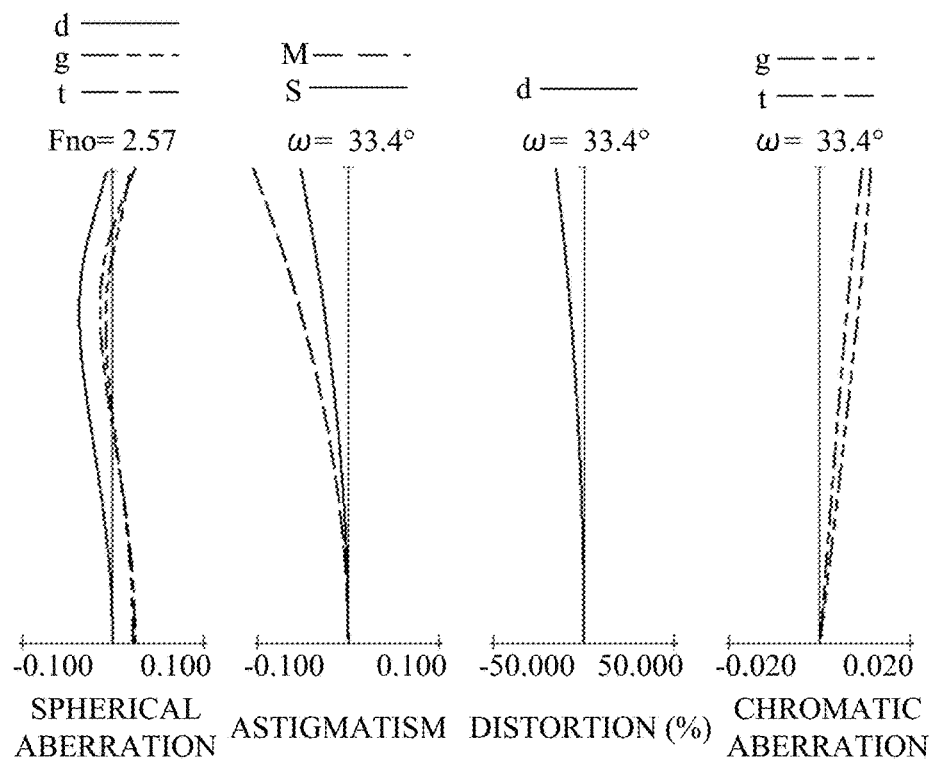
Figure 2C:
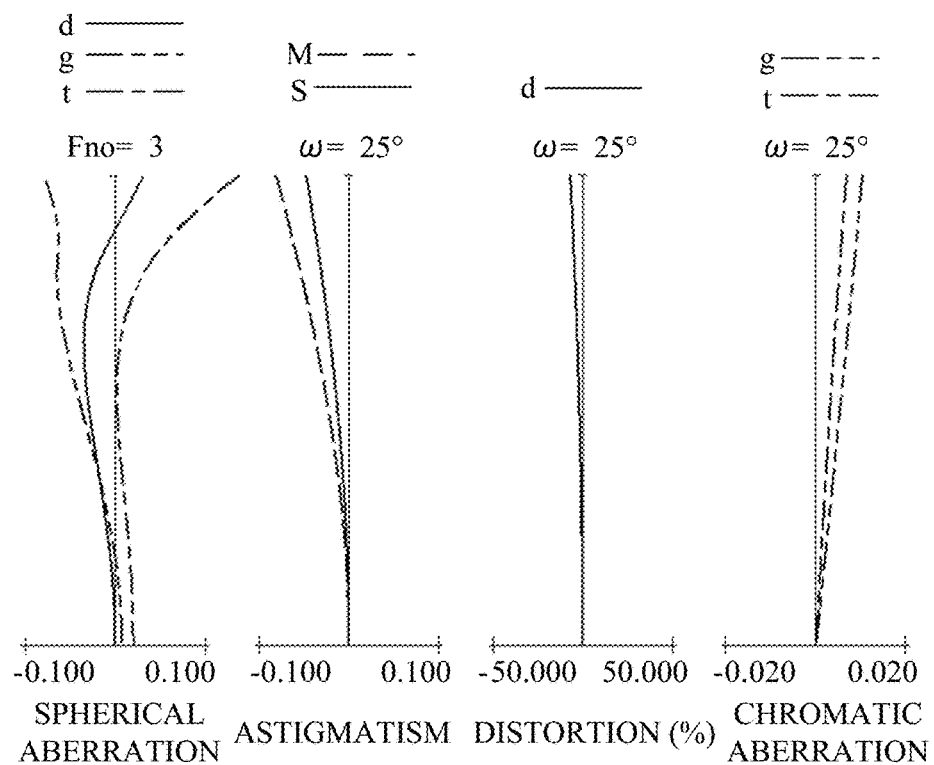
Figure 3:
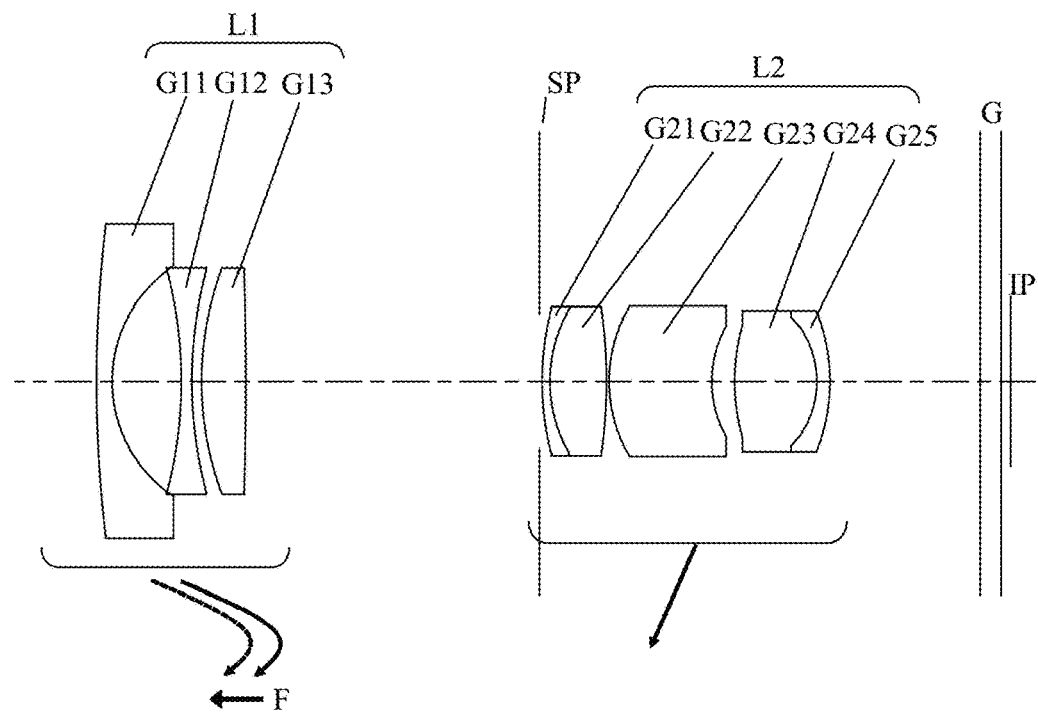
FIG. 3 illustrates a lens cross section and moving trajectories at a wide-angle end of a zoom lens according to Example 2.
Figure 4A:
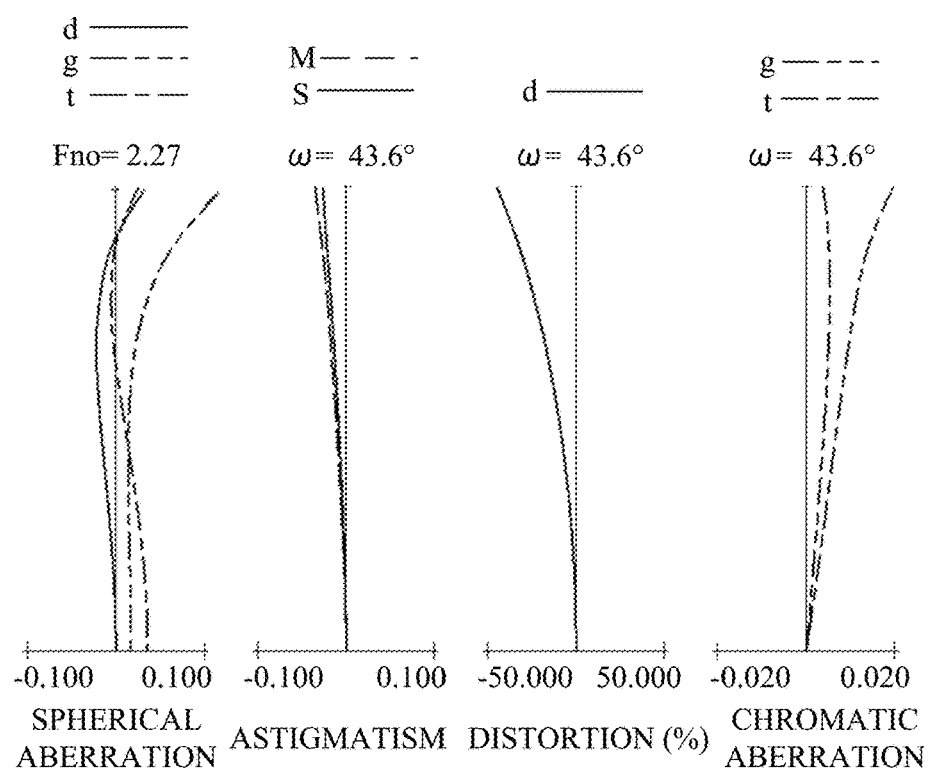
FIGS. 4A to 4C are various aberration diagrams of the zoom lens according to Example 2 at the wide-angle end, a zoom middle position, and a telephoto end, respectively.
Figure 4B:
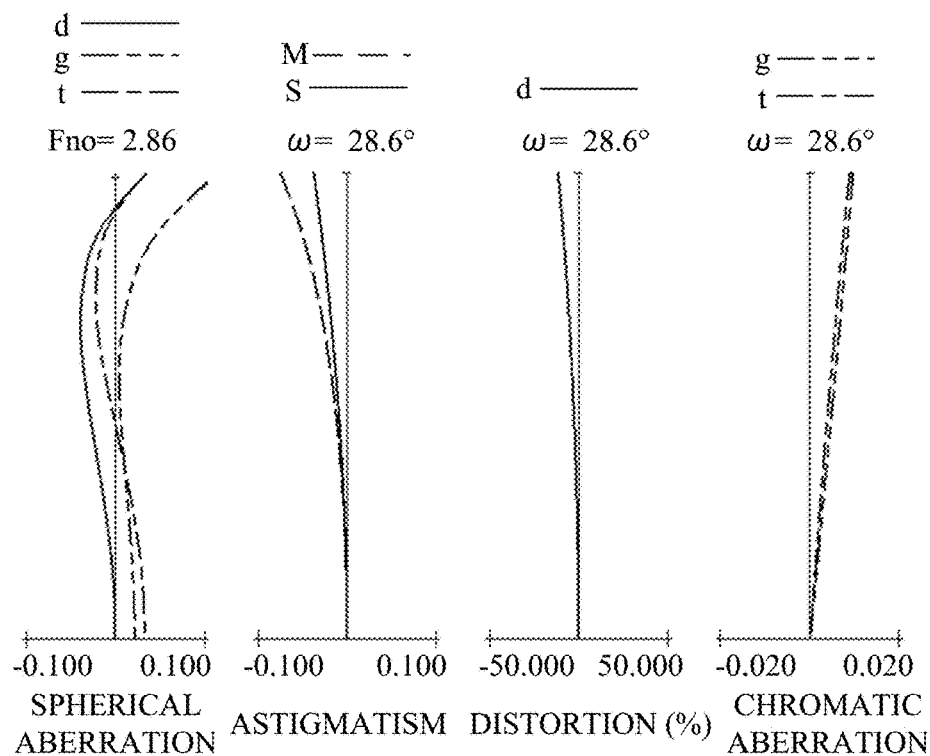
Figure 4C:
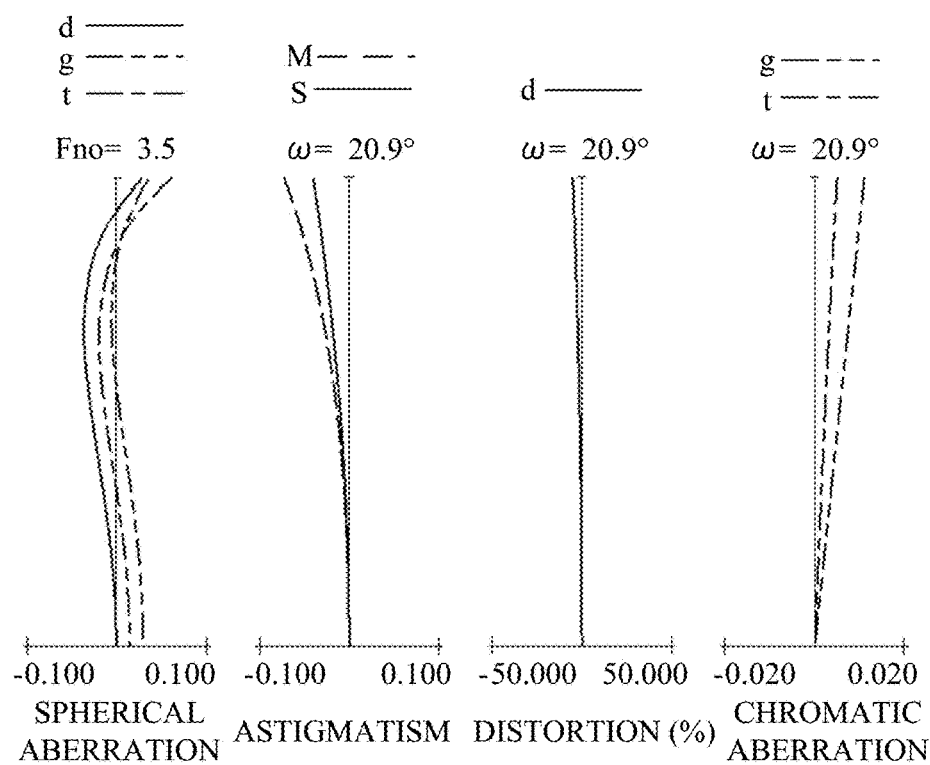
Figure 5:
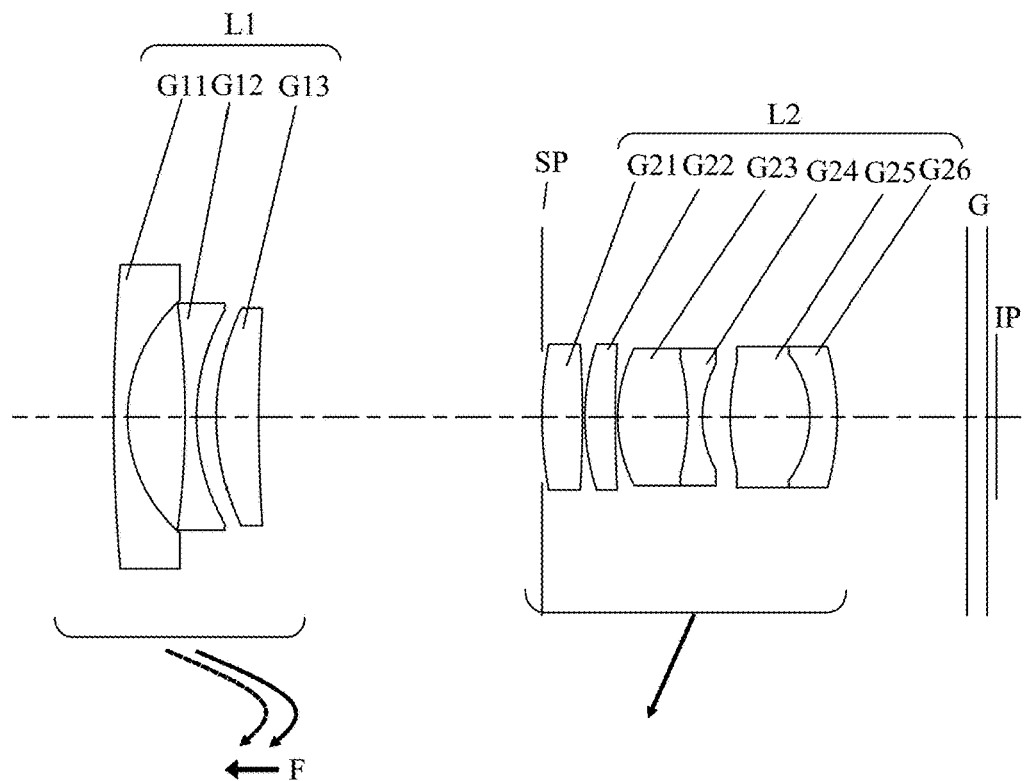
FIG. 5 illustrates a lens cross section and moving trajectories at a wide-angle end of a zoom lens according to Example 3.
Figure 6A:
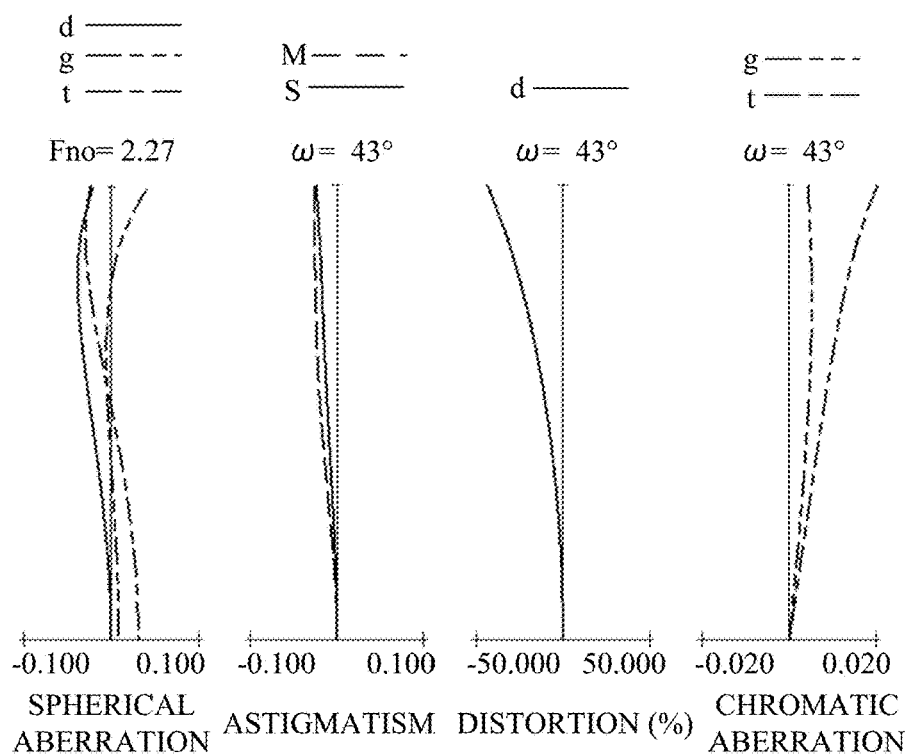
FIGS. 6A to 6C are various aberration diagrams of the zoom lens according to Example 3 at the wide-angle end, a zoom middle position, and a telephoto end, respectively.
Figure 6B:
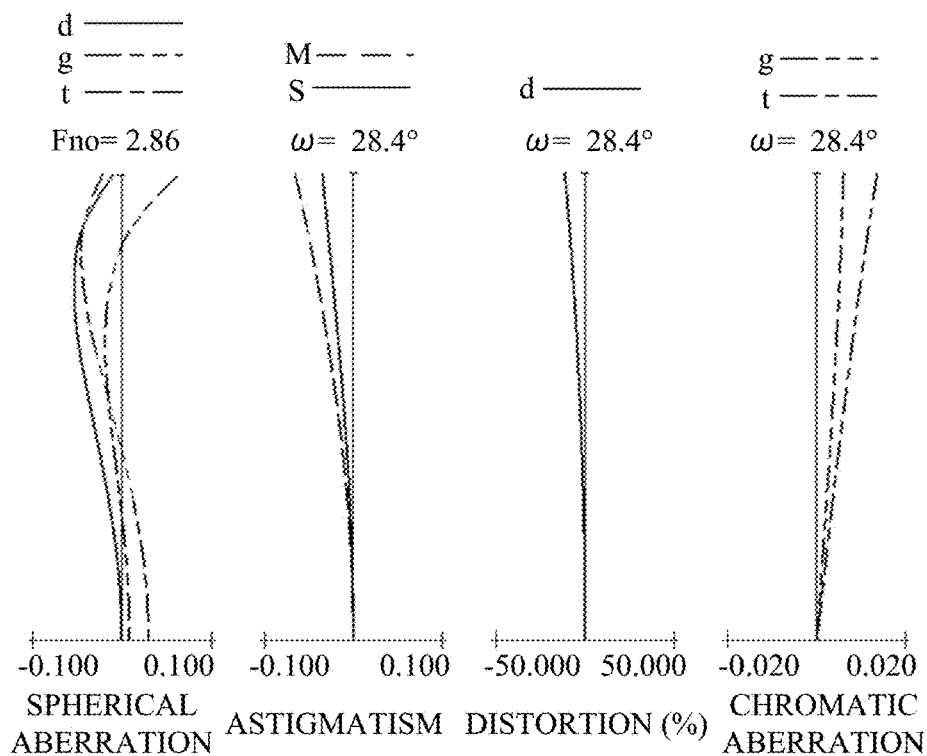
Figure 6C:
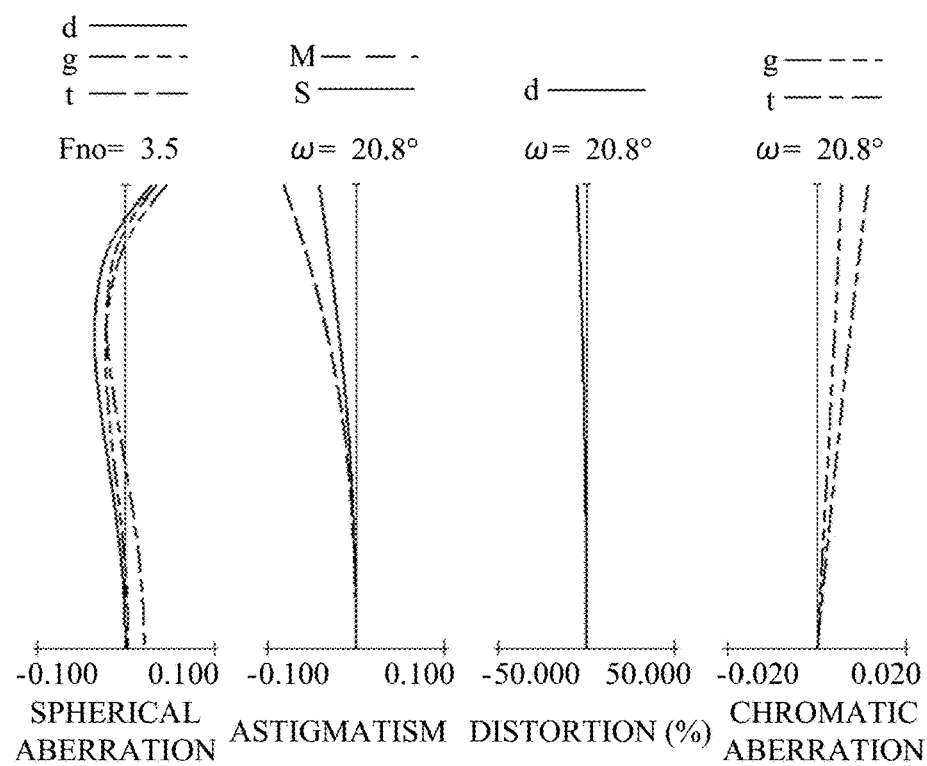
Figure 7:
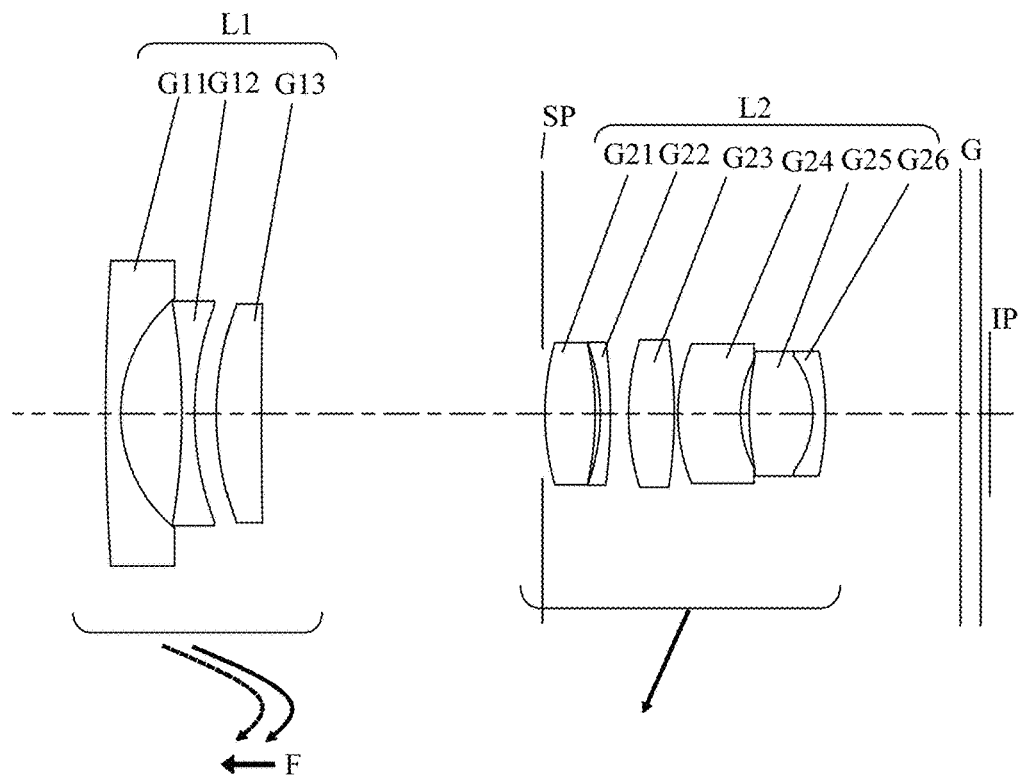
FIG. 7 illustrates a lens cross section and moving trajectories at a wide-angle end of a zoom lens according to Example 4.
Figure 8A:
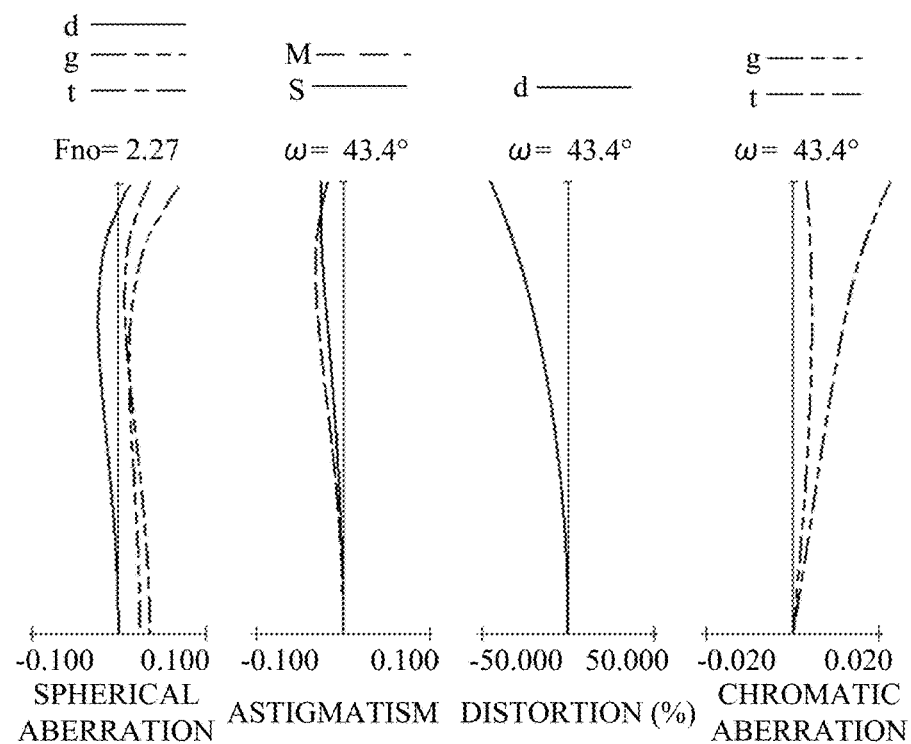
FIGS. 8A to 8C are various aberration diagrams of the zoom lens according to Example 4 at the wide-angle end, a zoom intermediate position, and a telephoto end, respectively.
Figure 8B:
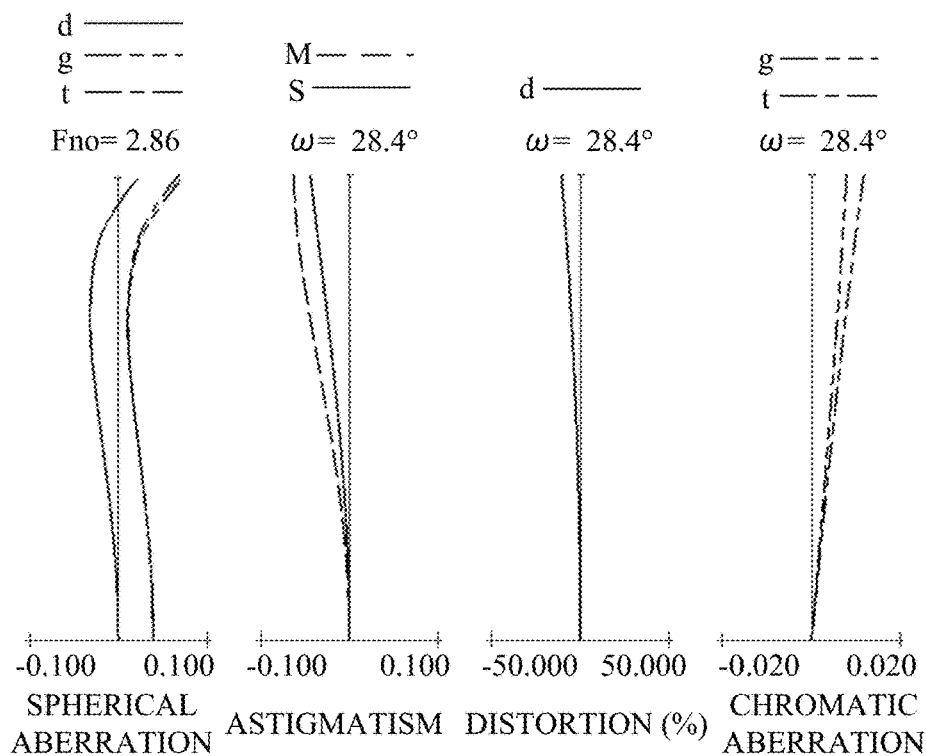
Figure 8C:
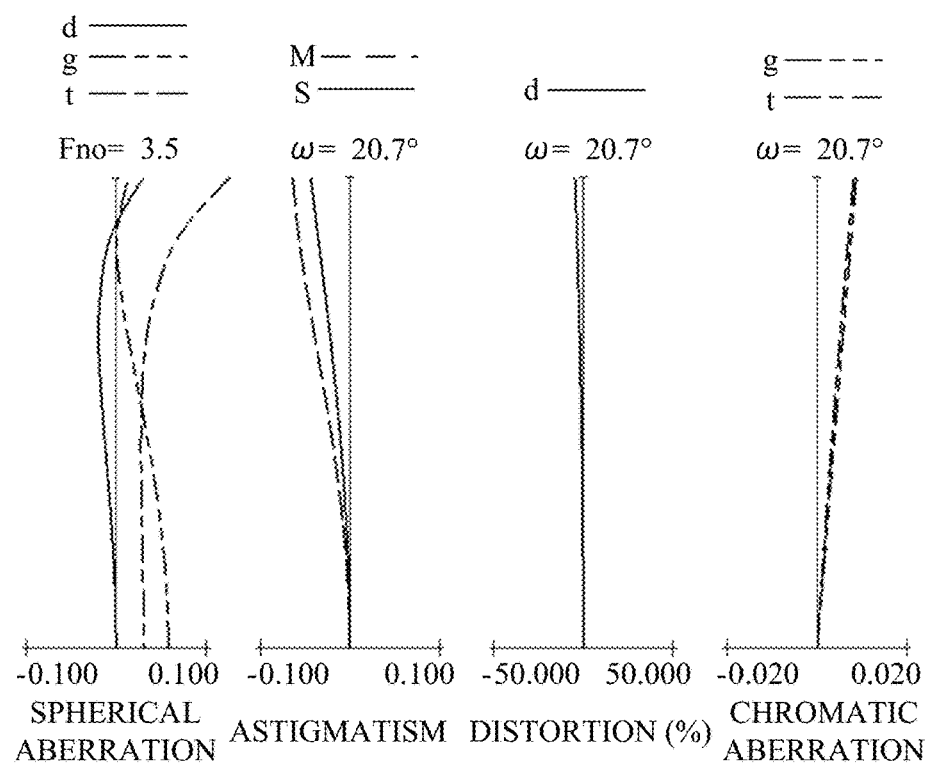

Referring now to FIG. 1 as an example, a description will be given of a method of moving the lens unit.

A magnification variation from the wide-angle end to the telephoto end is performed by independently moving the first lens unit (L1) and the second lens unit (L2).

As described above, the zoom type that constitutes the present invention has a two-unit negative lead (negative unit leading) configuration. This configuration provides the first lens unit L1 with a negative power and changes the distance between the lens units during the magnification varying for a wider angle scheme.

The magnification is varied by moving the positive lens unit located on the image side, and the negative unit is used to correct accompanying image plane variations. By limiting the number of movable units to two, the lens barrel structure can be made simple, and become advantageous to a compact structure. Focusing is made by the first lens unit L1.

In order to achieve the above purposes, the zoom lens according to each example of the present invention includes a first lens unit L1 having a negative refractive power and a second lens L2 having a positive refractive power in order from the object side to the image side. A distance between the first lens unit and the second lens unit varies during zooming. The second lens unit L2 includes an aperture stop and has two or more negative lenses. The following conditional expressions are satisfied:

$$-1.00<f1/f2<-0.60 \quad (1)$$

$$18<vd2n<39 \quad (2)$$

$$0.10<M2/TLw<0.28 \quad (3)$$

$$0.40<bfwt/f2<0.90 \quad (4)$$

where f1 is a focal length of the first lens unit L1, f2 is a focal length of the second lens unit L2, vd2n is an average of the smallest Abbe number and the second smallest Abbe number of the two or more negative lenses in the second lens unit L2, M2 is a moving amount of the second lens unit L2 for zooming from the wide-angle end to the telephoto end, TLw is an overall lens length at the wide-angle end, and bfwt is the shortest air-converted backfocus in the zoom range from the wide-angle end to the telephoto end.

Thereby, the focus shift can reduce in the near-infrared range and the zoom lens can be made compact.

The conditional expression (1) defines a ratio of a focal length of the first lens unit L1 to a focal length of the second lens unit L2. Satisfying the conditional expression (1) can provide an optimum power arrangement, suppress the chromatic aberration, and make the zoom lens compact.

If the value is higher than the upper limit of the conditional expression (1), the power of the second lens unit becomes strong relative to the focal length of the first lens unit L1. As a result, it becomes difficult to suppress the chromatic aberration, particularly to correct the chromatic aberration in the near infrared range.

If the value is lower than the lower limit of the conditional expression (1), the power of the second lens unit becomes weak relative to the focal length of the first lens unit L1. As a result, a moving amount of the second lens unit L2 becomes large, and the overall lens length becomes large.

The conditional expression (1) may be replaced with the following expression.

$$-0.90<f1/f2<-0.70 \quad (1a)$$

Alternatively, the conditional expression (1) may be replaced with the following expression.

$$-0.88<f1/f2<-0.73 \quad (1b)$$

The conditional expression (2) defines a numerical range of the average Abbe number of two negative lenses having small Abbe numbers in the second lens unit L2. Satisfying the conditional expression (2) can suppress the chromatic aberration.

If the value is higher than the upper limit of the conditional expression (2), a difference in Abbe number from other positive lenses becomes small, and the power of each lens becomes strong. Therefore, the chromatic aberration becomes worse, and it becomes difficult to achieve a high optical performance If the value is lower than the lower limit of the conditional expression (2), a difference in Abbe number from other positive lenses will become large, and it becomes difficult to sufficiently correct the chromatic aberration.

The conditional expression (2) may be replaced with the following expression.

$$25<vd2n<37 \quad (2a)$$

Alternatively, the conditional expression (2) may be replaced with the following expression.

$$26<vd2n<36 \quad (2b)$$

The conditional expression (3) defines a ratio of a moving amount of the second lens unit L2 from the wide-angle end to the telephoto end to the overall lens length at the wide-angle end. Satisfying the conditional expression (3) can suppress the chromatic aberration and make compact the zoom lens.

If the value is higher than the upper limit of the conditional expression (3), the moving amount of the second lens unit L2 becomes large relative to the overall lens length at the wide-angle end. As a result, it is difficult to achieve a compact zoom lens.

If the value is lower than the lower limit of the conditional expression (3), the moving amount of the second lens unit becomes small relative to the overall lens length at the wide-angle end. As a result, the power of the second lens unit L2 becomes strong, and it becomes difficult to achieve a high optical performance.

The conditional expression (3) may be replaced with the following expression.

$$0.12<M2/TLw<0.23 \quad (3a)$$

Alternatively, the conditional expression (3) may be replaced with the following expression.

$$0.13 < M2/TLw < 0.22 \quad (3b)$$

The conditional expression (4) defines a ratio of the air-converted backfocus to the focal length of the second lens unit L2 when it becomes the shortest in the entire magnification variation range. Satisfying the conditional expression (4) can make compact the zoom lens.

If the value is higher than the upper limit of the conditional expression (4), the power of the second lens unit L2 becomes strong relative to the air-converted backfocus. As a result, it becomes difficult to secure a high optical performance If the value is lower than the lower limit of the conditional expression (4), the air-converted backfocus becomes small, and it becomes difficult to secure a space for disposing a filter, etc.

The conditional expression (4) may be replaced with the following expression.

$$0.50 < bfwt/f2 < 0.85 \quad (4a)$$

Alternatively, the conditional expression (3) may be replaced with the following expression.

$$0.60 < bfwt/f2 < 0.82 \quad (4b)$$

The zoom lens according to each example may satisfy the following conditional expression, $$0.40 < M1/M2 < 1.10 \quad (5)$$

where M1 is a difference between the position of the first lens unit L1 at the wide-angle end and the position of the first lens unit L1 at the telephoto end.

The conditional expression (5) defines a ratio of the difference the positions of the first lens unit L1 at the wide-angle end and the telephoto end to the moving amount of the second lens unit L2 from the wide-angle end to the telephoto end. Satisfying the conditional expression (5) can suppress the chromatic aberration and make the zoom lens compact.

When the value is higher than the upper limit of the conditional expression (5), the moving amount of the second lens unit L2 becomes small relative to the difference of the first lens unit L1. As a result, the power of the second lens unit L2 becomes stronger and the chromatic aberration becomes worse, and it becomes difficult to achieve a high optical performance When the value is lower than the lower limit of the conditional expression (5), the moving amount of the second lens unit L2 becomes large relative to the difference of the first lens unit L1. As a result, the compact structure becomes difficult.

The conditional expression (5) may be replaced with the following expression.

$$0.41 < M1/M2 < 1.00 \quad (5a)$$

Alternatively, the conditional expression (3) may be replaced with the following expression.

$$0.43 < M1/M2 < 0.98 \quad (5b)$$

The zoom lens according to each example may satisfy the following conditional expression:

$$25 < vd2ap - vd2an < 50 \quad (6)$$

where $vd2ap$ is an average of Abbe numbers of all positive lenses included in the second lens unit L2, and $vd2an$ is an average of Abbe numbers of all negative lenses included in the second lens unit L2.

The conditional expression (6) defines a difference between the average of the Abbe numbers of all the positive lenses included in the second lens unit L2 and the average of the Abbe numbers of all the negative lenses included in the second lens unit L2. Satisfying the conditional expression (6) can suppress the chromatic aberration.

If the value is higher than the upper limit of the conditional expression (6), it becomes difficult to balance the chromatic aberrations of the near infrared light and the visible light.

If the value is lower than the lower limit of the conditional expression (6), the chromatic aberration becomes insufficiently corrected in the near infrared range.

The conditional expression (6) may be replaced with the following expression.

$$27 < vd2ap - vd2an < 48 \quad (6a)$$

Alternatively, the conditional expression (3) may be replaced with the following expression.

$$28 < vd2ap - vd2an < 46 \quad (6b)$$

In the zoom lens according to each example, the first lens unit L1 may include (at least one) positive lens. Then, the following conditional expressions may be satisfied:

$$14 < vd1p < 21 \quad (7)$$

$$1.85 < Nd1p < 2.10 \quad (8)$$

where $vd1p$ is an average of Abbe numbers of all positive lenses included in the first lens unit L1 and $Nd1p$ is an average of refractive indices of all the positive lenses included in the first lens unit L1.

The conditional expression (7) defines an average Abbe number of the positive lens of the first lens unit L1.

If the value is higher than the upper limit of the conditional expression (7), the power of each lens of the first lens unit L1 becomes stronger, and the chromatic aberration becomes stronger, and it becomes difficult to achieve a high optical performance.

If the value is lower than the lower limit of the conditional expression (7), the power of each lens of the first lens unit L1 becomes weaker and the chromatic aberration becomes insufficiently corrected.

The conditional expression (8) defines an average refractive index of the positive lenses included in the first lens unit L1.

If the value is higher than the upper limit of the conditional expression (8), high-order aberrations cannot be corrected, and it becomes difficult to achieve a high optical performance If the value is lower than the lower limit of the conditional expression (8), the curvatures of the positive lenses become excessive, the chromatic aberration become worse, and it becomes difficult to achieve a high optical performance The conditional expressions (7) and (8) may be replaced with the following expressions.

$$16 < vd1p < 20 \quad (7a)$$

$$1.87 < Nd1p < 2.05 \quad (8a)$$

Alternatively, the conditional expressions (7) and (8) may be replaced with the following expressions.

$$17 < vd1p < 19 \quad (7b)$$

$$1.90 < Nd1p < 2.00 \quad (8b)$$

In the zoom lens according to each example, the first lens unit L1 may include a negative lens, a negative lens, and a positive lens in order from the object side to the image side, and the following conditional expression may be satisfied:

$$0.70 < f1g1/f1 < 1.50 \tag{9}$$

where f1g1 is a focal length of the negative lens closest to the object in the first lens unit L1.

The conditional expression (9) defines a ratio of the focal length of the negative lens closest to the object in the first lens unit L1 to the focal length of the first lens unit L1. Satisfying the conditional expression (9) can provide a high optical performance and a compact zoom lens.

If the value is higher than the upper limit of the conditional expression (9), the power of the first lens unit L1 becomes weaker, the moving amount increases, and the compact structure becomes difficult.

If the value is lower than the lower limit of the conditional expression (9), the power of the first lens unit L1 becomes stronger, the chromatic aberration deteriorates, and a high optical performance cannot be achieved.

The conditional expression (9) may be replaced with the following expression.

$$0.80 < f1g1/f1 < 1.30 \tag{9a}$$

Alternatively, the conditional expression (9) may be replaced with the following expression.

$$0.85 < f1g1/f1 < 1.20 \tag{9b}$$

In the zoom lens according to each example, the lens disposed closest to the image plane in the second lens unit L2 may be a negative meniscus lens having a convex surface facing the image side, and the following conditional expression may be satisfied:

$$-1.80 < f2ge/f2 < -0.50 \tag{10}$$

where f2ge is a focal length of the negative meniscus lens.

The conditional expression (10) defines a ratio of the focal length of the negative lens closest to the image plane in the second lens unit L2 to the focal length of the second lens unit L2. Satisfying the conditional expression (10) can provide both a high optical performance and a compact zoom lens.

If the value is higher than the upper limit of the conditional expression (10), the power of the negative lens closest to the image plane in the second lens unit L2 becomes weaker. As a result, the aberrational correction of the curvature of field becomes insufficient, and it becomes difficult to achieve a high optical performance.

If the value is lower than the lower limit of the conditional expression (10), the power of the negative lens closest to the image plane of the second lens unit L2 becomes stronger. As a result, the light incident angle on the image plane becomes large, and shading occurs.

The conditional expression (10) may be replaced with the following expression.

$$-1.60 < f2ge/f2 < -0.60 \tag{10a}$$

Alternatively, the conditional expression (10) may be replaced with the following expression.

$$-1.50 < f2ge/f2 < -0.70 \tag{10b}$$

The zoom lens according to each example may satisfy the following conditional expression:

$$0.70 < d2G/2GTL < 0.98 \tag{11}$$

where d2G is a total central thickness of all lenses included in the second lens unit L2, and 2GTL is an overall length of the second lens unit L2 (a length from the vertex of the optical axis lens vertex closest to the object to the vertex of the optical axis lens closest to the image plane).

The conditional expression (11) defines a ratio of the total central thickness of all the lenses included in the second lens unit L2 to the overall length of the second lens unit L2. The conditional expression (11) can provide both a high optical performance and a compact zoom lens.

When the value is higher than the upper limit of conditional expression (11), the central thickness of all the lenses included in the second lens unit L2 becomes large relative to the overall length of the second lens unit L2. As a result, the power of each lens increases, various aberrations occur, and it becomes difficult to achieve a high optical performance.

When the value is lower than the lower limit of the conditional expression (11), the central thickness of all the lenses included in the second lens unit L2 becomes small relative to the overall length of the second lens unit L2. As a result, it becomes difficult to satisfactorily correct each aberration while achieving the compact structure.

The conditional expression (11) may be replaced with the following expression.

$$0.75 < d2G/2GTL < 0.95 \tag{11a}$$

Alternatively, the conditional expression (11) may be replaced with the following expression.

$$0.80 < d2G/2GTL < 0.95 \tag{11b}$$

Next follows a description of the lens configuration of the zoom lens according to each example.

Unless otherwise specified, the lens configuration will be described in order from the object side to the image side. In the lens cross-sectional views according to each example, the left side is the object side and the right side is the image side. The wide-angle end and the telephoto end are zoom positions when the zoom lens unit is mechanically located at both ends of the movable range on the optical axis. Each lens unit moves from the wide-angle end to the telephoto end along a trajectory as indicated by an arrow (solid line) shown in the lens cross-sectional view.

The solid curve and the dotted curve of the first lens unit L1 are moving trajectories for correcting the image plane variations associated with the zoom positions from the wide-angle end to the telephoto end during focusing on an object at infinity and a short distance object, respectively. For example, in focusing from the object at infinity to the short distance object at the zoom position at the telephoto end, each lens is moved as shown by an arrow F.

The aperture stop is installed in front of the second lens unit L2 (on the object side), and moves together with the second lens unit L2 during zooming. The aperture stop may be configured to independently move, which has an advantage in that it is easy to shield light that causes flare light.

The lens configuration according to each example will be described in detail below.

EXAMPLE 1

The zoom lens according to Example 1 has a two-unit configuration and negative and positive power arrangements. During zooming, the first lens unit L1 and the second lens unit L2 move. During zooming from the wide-angle end to the telephoto end, the first lens unit L1 has a trajectory such that it has a convex shape on the image side, and the second lens unit L2 monotonously moves to the object.

The first lens unit L1 includes a negative meniscus lens G11 having a convex shape on the object side, a negative biconcave lens G12, and a positive meniscus lens G13 having a convex shape on the object side.

The second lens unit L2 includes a positive biconvex lens G21, a meniscus lens G22 having a convex shape on the image side, a negative meniscus lens G23 having a convex shape on the object side, a positive biconvex lens G24, and a negative meniscus lens G25 having a convex shape on the image side. The materials of these lenses are not limited to glass, and may use E48R (manufactured by Zeon Corporation), which is a plastic material having good moldability.

The positive lens G21 uses a low-dispersion glass with a large Abbe number, and corrects the lateral and longitudinal chromatic aberrations well. Glass examples having a large Abbe number include S-FPL51 and S-FPL55 (manufactured by OHARA Corporation).

EXAMPLE 2

In a zoom lens according to Example 2, a second lens unit L2 includes a negative meniscus lens G21 having a convex shape on the object side, a positive biconvex lens G22, a meniscus lens G23 having a convex shape on the object side, a positive biconvex lens G24, and a negative meniscus lens G25 having a convex shape on the image side.

The positive biconvex lens G22 uses a low-dispersion glass with a large Abbe number, and corrects longitudinal and lateral chromatic aberrations well.

Other characteristics are the same as those in Example 1.

EXAMPLE 3

In a zoom lens according to Example 3, a second lens unit L2 includes a positive biconvex lens G21, a positive biconvex lens G22, a positive biconvex lens G23, a negative biconcave lens G24, a positive biconvex lens G25, and a negative meniscus lens G26 having a convex shape on the image side.

A low-dispersion glass with a large Abbe number is used for the lenses G21, G22, and G23, and the longitudinal and lateral chromatic aberrations are well corrected.

Other characteristics are the same as those in Example 1.

EXAMPLE 4

In a zoom lens according to Example 4, a second lens unit L2 includes a positive biconvex lens G21, a negative meniscus lens G22 having a convex shape on the image side, a positive biconvex lens G23, a meniscus shape G24 having a convex shape on the object side, a positive biconvex lens G25, and a negative meniscus lens G26 having a convex shape on the image side.

A low-dispersion glass with a large Abbe number is used for the lenses G21 and G23, and the longitudinal and lateral chromatic aberrations are well corrected.

Other characteristics are the same as those in Example 1.

Image Pickup Apparatus

Figure 9:
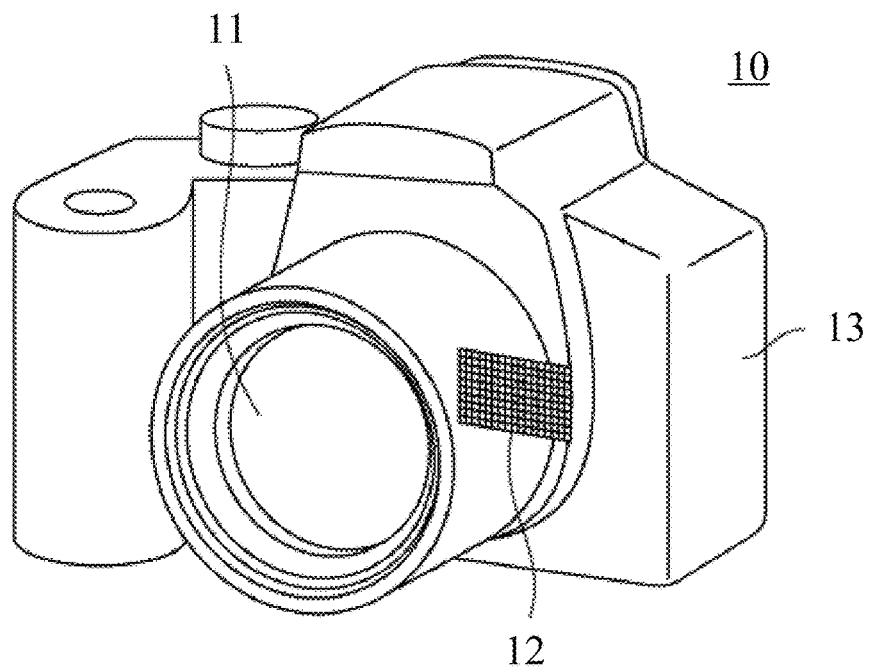
FIG. 9 is a schematic diagram of an image pickup apparatus.

Referring now to FIG. 9, a description will be given of an embodiment of a digital still camera (image pickup apparatus) using the optical system (zoom lens) according to the present invention for an imaging optical system. In FIG. 9, reference numeral 10 denotes a camera body, and reference numeral 11 denotes an imaging optical system including any of the optical systems described in Examples 1 to 4. Reference numeral 12 denotes a solid-state image sensor (photoelectric conversion element) such as a CCD sensor or a CMOS sensor which is built in the camera body and receives an optical image formed by the imaging optical system 11 and photoelectrically converts the optical image. The camera body 10 may be a so-called single lens reflex camera having a quick turn mirror or a so-called mirrorless camera having no quick turn mirror.

By thus applying the optical system according to the present invention to an image pickup apparatus such as a digital still camera, the image pickup apparatus can have a small lens.

Image Pickup System

An image pickup system (also referred to as a lens apparatus or a surveillance camera system) including the zoom lens according to each example and a controller that controls the zoom lens may be implemented. In this case, the controller can control the zoom lens so that each lens unit moves as described above during zooming. At this time, the controller does not have to be integrated with the zoom lens, and the controller may be separate from the zoom lens. For example, a controller (control apparatus) remotely disposed from a driver that drives each lens in the zoom lens may generate a control signal (command) for controlling the zoom lens, and a transmitter may send it. Such a controller can remotely control the zoom lens.

By providing to the controller an operation unit, such as a controller and buttons, for remotely controlling the zoom lens, the zoom lens may be controlled (a control signal is generated) according to an input to the operation unit by the user. For example, a scaling-up button and a scaling-down button may be provided as the operation unit in order to send a signal from the controller to the driver in the zoom lens so that the magnification of the zoom lens increases as the user presses the scaling-up button and the magnification of the zoom lens decreases as the user presses the scaling-down button.

The image pickup system or the controller may include a display unit, such as a liquid crystal panel, for displaying information (moving state) on zooming of the zoom lens. The information on the zooming of the zoom lens includes, for example, a zoom magnification (zoom state) and a moving amount (moving state) of each lens unit. In this case, the user can remotely control the zoom lens via the operation unit while viewing the information on zooming of the zoom lens displayed on the display unit. At this time, the display unit and the operation unit may be integrated with each other, for example, through a touch panel.

Figure 10:
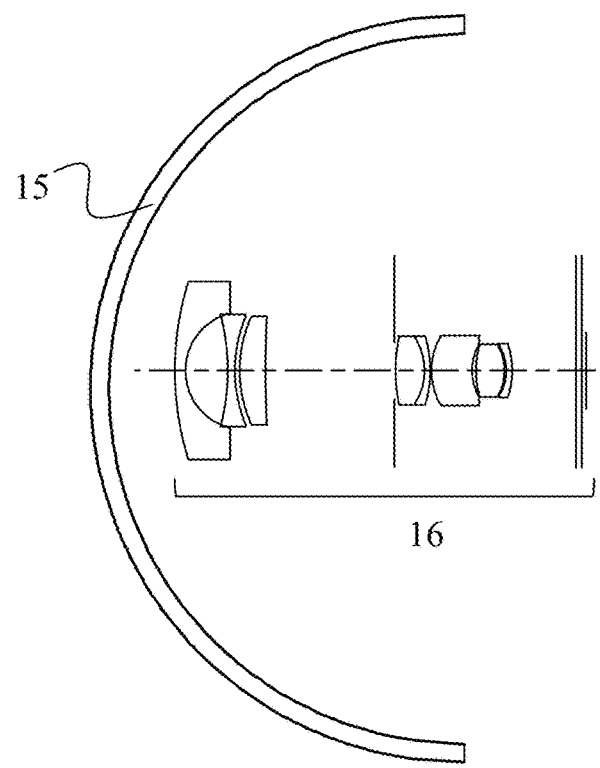
FIG. 10 illustrates a dome cover and a lens cross section of the zoom lens according to Example 1.

FIG. 10 is a sectional view when the zoom lens (lens unit) 16 according to each example is used for a surveillance camera system together with a dome cover 15. The dome cover is made of a plastic material, such as polymethyl methacrylate (PMMA) or polycarbonate (PC), and has a thickness of about several millimeters. Thereby, in forming an image pickup apparatus with a dome cover, various aberrations may be corrected by designing in consideration of the influence of the dome cover (focal length and material).

Figure 11:
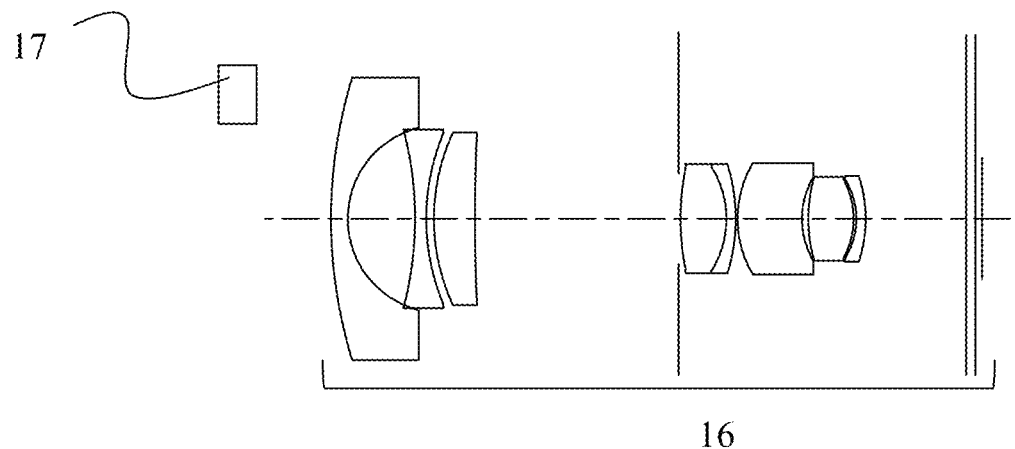
FIG. 11 illustrates a protective cover and a lens cross section of the zoom lens according to Example 1.

FIG. 11 is a cross sectional view when the zoom lens according to each example is used for a surveillance camera system together with a protective cover 17 having a flat plate shape.

Figures 12A, 12B:
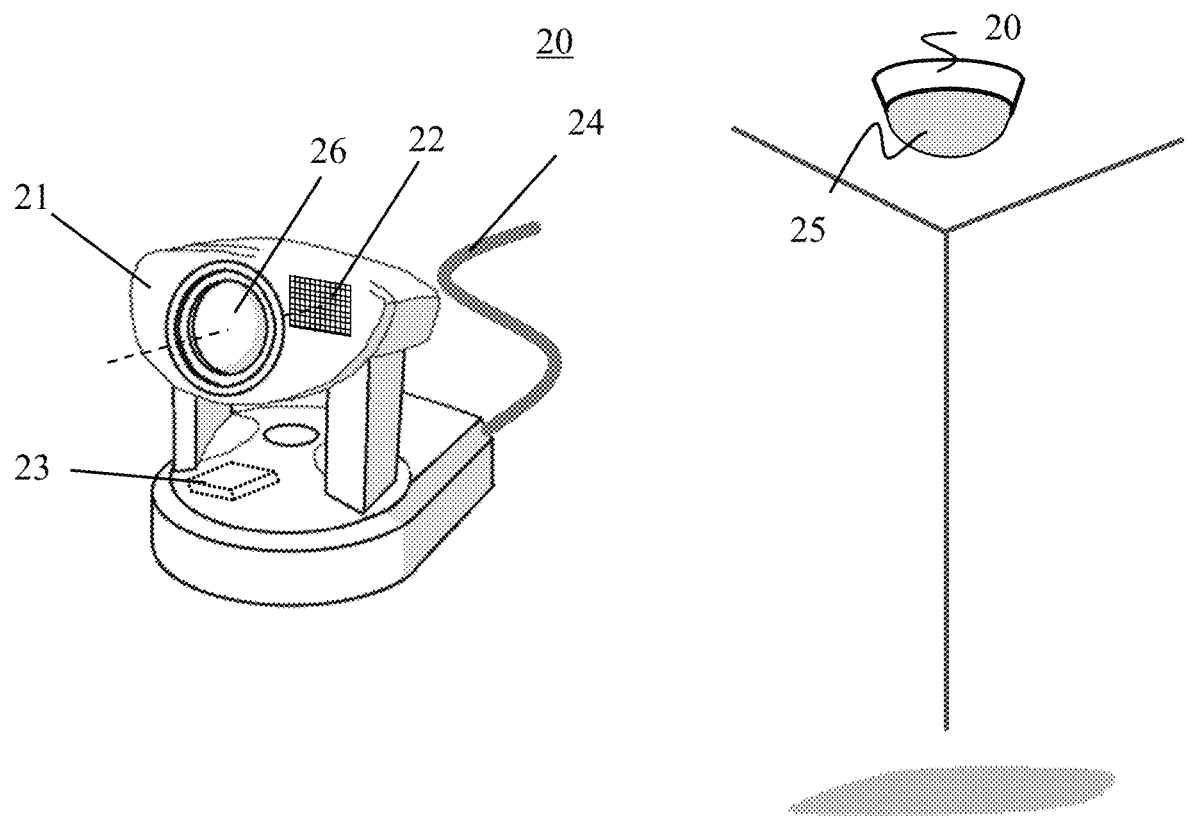
FIG. 12A illustrates a surveillance camera system according to the present invention
FIG. 12B illustrates a dome cover attached to the surveillance camera system while being attached to a ceiling.

Referring now to FIG. 12A, a description will be given of an embodiment of a surveillance camera system 20 using the zoom lens according to each example as an imaging optical system.

In FIG. 12A, reference numeral 21 denotes a surveillance camera body, reference numeral 22 denotes a built-in solid-state image sensor (photoelectric conversion element) built in the camera body, such as a CCD sensor or a CMOS sensor, which receives an object image formed by the lens unit 26. Reference numeral 23 denotes a memory unit that records information corresponding to the object image photoelectrically converted by the solid-state image sensor 22. Reference numeral 24 denotes a network cable for transferring the object image photoelectrically converted by the solid-state image sensor 22. FIG. 12B is an example when the dome-shaped cover 25 is attached to the surveillance camera system 20, which is used while being attached to the ceiling.

As described above, each example can provide a compact telephoto zoom lens having a small F-number, and a high performance capable of capture an image at a long distance, an image pickup apparatus, and a surveillance camera system each having the same.

Each example is not limited to the shape and the number of glasses shown in each example, and can properly change them. For example, part of lenses and lens units may be moved with a component in a direction orthogonal to the optical axis to correct image blurs caused by shakes such as camera shakes. Distortions, chromatic aberrations, etc. may be corrected by an electrical corrector.

Next, Numerical Examples 1 to 4 corresponding to Examples 1 to 4 will be shown.

In surface data according to each numerical example, r indicates a radius of curvature of each optical surface, and d (mm) indicates an axial distance (distance on the optical axis) between an m-th surface and an (m+1)-th surface, where m is the number of a surface counted from the light incident side. In addition, nd represents a refractive index of each optical element for the d-line, and vd represents an Abbe number based on the d-line of the optical element. The Abbe number vd of a certain material is expressed as follows, $$vd=(Nd-1)/(NF-NC)$$

where Nd, NF, and NC are the refractive indices for the d-line (587.6 nm), the F-line (486.1 nm), and the C-line (656.3 nm) in the Fraunhofer line.

In each numerical example, all values of d, focal length f (mm), F-number Fno, and half angle of view (degree) are set when the optical system of each example focuses on the object at infinity. The "backfocus" is a distance expressed on the optical axis from the final lens surface (the lens surface closest to the image plane) to the paraxial image plane in terms of the air-converted length. The "overall lens length" is a length obtained by adding the backfocus to the distance on the optical axis from the forefront surface (the lens surface closest to the object) to the final surface in the zoom lens. The "lens unit" may include a plurality of lenses or only a single lens.

NUMERICAL EXAMPLE 1
UNIT: mm

Surface data

| surface number | r | d | nd | vd |
|---|---|---|---|---|
| 1 | 25.720 | 0.90 | 1.90366 | 31.3 |
| 2 | 5.046 | 3.61 | | |
| 3 | −18.634 | 0.60 | 1.69680 | 55.5 |
| 4 | 11.881 | 0.41 | | |
| 5 | 11.012 | 2.20 | 1.95906 | 17.5 |
| 6 | 95.453 | (variable) | | |
| 7(stop) | ∞ | 0.10 | | |
| 8 | 13.572 | 2.47 | 1.49700 | 81.5 |
| 9 | −5.238 | 0.50 | 1.84666 | 23.8 |
| 10 | −9.800 | 0.10 | | |
| 11 | 5.872 | 3.46 | 1.80518 | 25.4 |
| 12 | 4.440 | 0.34 | | |
| 13 | 8.079 | 2.43 | 1.59522 | 67.7 |
| 14 | −4.394 | 0.15 | | |
| 15 | −3.962 | 0.50 | 1.91650 | 31.6 |
| 16 | −7.303 | (variable) | | |
| 17 | ∞ | 0.50 | 1.52000 | 61.4 |
| 18 | ∞ | 0.36 | | |
| image plane | ∞ | | | |

VARIOUS DATA

| Zoom ratio | | 2.40 | |
|---|---|---|---|
| | Wide-angle | Middle | Telephoto |
| Focal length | 2.90 | 4.92 | 6.94 |
| F-number | 2.16 | 2.57 | 3.00 |
| Half angle of view | 48.22 | 33.37 | 25.01 |
| Image height | 3.24 | 3.24 | 3.24 |
| Total lens length | 34.96 | 30.67 | 30.33 |
| BF | 0.36 | 0.36 | 0.36 |
| d 6 | 10.94 | 4.15 | 1.33 |
| d 16 | 5.39 | 7.88 | 10.37 |
| d 18 | 0.36 | 0.36 | 0.36 |

ZOOM LENS UNIT DATA

| Unit | Starting surface | Focal length |
|---|---|---|
| 1 | 1 | −6.23 |
| 2 | 7 | 7.66 |
| 3 | 17 | ∞ |

NUMERICAL EXAMPLE 2
UNIT: mm

Surface data

| surface number | r | d | nd | vd |
|---|---|---|---|---|
| 1 | 49.926 | 0.60 | 1.90366 | 31.3 |
| 2 | 5.286 | 2.65 | | |
| 3 | −16.500 | 0.40 | 1.72916 | 54.7 |
| 4 | 16.398 | 0.37 | | |
| 5 | 12.284 | 1.67 | 1.92286 | 18.9 |
| 6 | −126.006 | (variable) | | |
| 7(stop) | ∞ | 0.10 | | |
| 8 | 11.018 | 0.30 | 1.84666 | 23.8 |
| 9 | 5.500 | 2.17 | 1.49700 | 81.5 |
| 10 | −19.883 | 0.10 | | |
| 11 | 5.650 | 3.93 | 1.84666 | 23.8 |
| 12 | 4.302 | 0.88 | | |
| 13 | 7.800 | 3.13 | 1.59522 | 67.7 |
| 14 | −3.630 | 0.50 | 1.90366 | 31.3 |
| 15 | −7.222 | (variable) | | |
| 16 | ∞ | 0.80 | 1.52000 | 61.4 |
| 17 | ∞ | 0.37 | | |
| image plane | ∞ | | | |

VARIOUS DATA

| Zoom ratio | | 2.50 | |
|---|---|---|---|
| | Wide-angle | Middle | Telephoto |
| Focal length | 3.40 | 5.95 | 8.50 |
| F-number | 2.27 | 2.86 | 3.50 |
| Half angle of view | 43.62 | 28.58 | 20.87 |
| Image height | 3.24 | 3.24 | 3.24 |
| Total lens length | 34.96 | 31.01 | 31.37 |
| BF | 0.37 | 0.37 | 0.37 |
| d 6 | 11.23 | 4.06 | 1.20 |
| d 15 | 5.76 | 8.98 | 12.20 |
| d 17 | 0.37 | 0.37 | 0.37 |

NUMERICAL EXAMPLE 2
UNIT: mm

ZOOM LENS UNIT DATA

| Unit | Starting surface | Focal length |
|---|---|---|
| 1 | 1 | −6.71 |
| 2 | 7 | 8.47 |
| 3 | 16 | ∞ |

NUMERICAL EXAMPLE 3
UNIT: mm

Surface data

| surface number | r | d | nd | νd |
|---|---|---|---|---|
| 1 | 67.304 | 0.55 | 1.90366 | 31.3 |
| 2 | 6.111 | 2.28 | | |
| 3 | −33.148 | 0.45 | 1.69680 | 55.5 |
| 4 | 8.480 | 0.78 | | |
| 5 | 9.979 | 1.66 | 1.92286 | 18.9 |
| 6 | 63.083 | (variable) | | |
| 7(stop) | ∞ | 0.00 | | |
| 8 | 15.890 | 1.60 | 1.49700 | 81.5 |
| 9 | −45.173 | 0.10 | | |
| 10 | 9.109 | 1.20 | 1.49700 | 81.5 |
| 11 | 51.568 | 0.10 | | |
| 12 | 5.915 | 2.77 | 1.49700 | 81.5 |
| 13 | −9.222 | 0.58 | 1.59551 | 39.2 |
| 14 | 4.334 | 1.10 | | |
| 15 | 8.808 | 3.13 | 1.65844 | 50.9 |
| 16 | −4.145 | 1.08 | 1.90366 | 31.3 |
| 17 | −10.176 | (variable) | | |
| 18 | ∞ | 0.80 | 1.52000 | 61.4 |
| 19 | ∞ | 0.36 | | |
| image plane | ∞ | | | |

VARIOUS DATA

| Zoom ratio | | 2.45 | |
|---|---|---|---|
| | Wide-angle | Middle | Telephoto |
| Focal length | 3.48 | 6.00 | 8.52 |
| F-number | 2.27 | 2.86 | 3.50 |
| Half angle of view | 42.98 | 28.38 | 20.82 |
| Image height | 3.24 | 3.24 | 3.24 |
| Total lens length | 34.86 | 31.29 | 31.81 |
| BF | 0.36 | 0.36 | 0.36 |
| d 6 | 11.18 | 4.29 | 1.48 |
| d 17 | 5.14 | 8.46 | 11.79 |
| d 19 | 0.36 | 0.36 | 0.36 |

ZOOM LENS UNIT DATA

| Unit | Starting surface | Focal length |
|---|---|---|
| 1 | 1 | −6.57 |
| 2 | 7 | 8.67 |
| 3 | 18 | ∞ |

NUMERICAL EXAMPLE 4
UNIT: mm

Surface data

| surface number | r | d | nd | νd |
|---|---|---|---|---|
| 1 | 85.310 | 0.60 | 1.90366 | 31.3 |
| 2 | 5.881 | 2.41 | | |
| 3 | −25.859 | 0.50 | 1.69680 | 55.5 |
| 4 | 11.897 | 0.86 | | |
| 5 | 12.166 | 1.76 | 1.92286 | 18.9 |
| 6 | 240.196 | (variable) | | |
| 7(stop) | ∞ | 0.10 | | |
| 8 | 10.211 | 1.98 | 1.49700 | 81.5 |
| 9 | −12.724 | 0.20 | | |
| 10 | −7.974 | 0.40 | 1.67270 | 32.1 |
| 11 | −21.519 | 0.72 | | |
| 12 | 9.888 | 1.80 | 1.49700 | 81.5 |
| 13 | −19.716 | 0.15 | | |
| 14 | 7.197 | 2.47 | 1.84666 | 23.8 |
| 15 | 4.497 | 0.34 | | |
| 16 | 10.251 | 2.50 | 1.62041 | 60.3 |
| 17 | −3.748 | 0.50 | 1.90525 | 35.0 |
| 18 | −11.434 | (variable) | | |
| 19 | ∞ | 0.80 | 1.52000 | 61.4 |
| 20 | ∞ | 0.36 | | |
| image plane | ∞ | | | |

VARIOUS DATA

| Zoom ratio | | 2.50 | |
|---|---|---|---|
| | Wide-angle | Middle | Telephoto |
| Focal length | 3.42 | 5.99 | 8.56 |
| F-number | 2.27 | 2.86 | 3.50 |
| Half angle of view | 43.43 | 28.41 | 20.74 |
| Image height | 3.24 | 3.24 | 3.24 |
| Total lens length | 34.84 | 30.81 | 31.00 |
| BF | 0.36 | 0.36 | 0.36 |
| d 6 | 11.07 | 4.02 | 1.20 |
| d 18 | 5.33 | 8.34 | 11.35 |
| d 20 | 0.36 | 0.36 | 0.36 |

ZOOM LENS UNIT DATA

| Unit | Starting surface | Focal length |
|---|---|---|
| 1 | 1 | −6.93 |
| 2 | 7 | 8.13 |
| 3 | 19 | ∞ |

Various values in each numerical example are summarized in Table 1 below.

TABLE 1

| | | Numerical range | | NUMERICAL EXAMPLE | | | |
|---|---|---|---|---|---|---|---|
| | | lower | upper | | | | |
| No. | Expression | limit | limit | 1 | 2 | 3 | 4 |
| 1 | f1/f2 | −1.00 | −0.60 | −0.81 | −0.79 | −0.76 | −0.85 |
| 2 | νd2n | 18 | 39 | 27.69 | 27.56 | 35.29 | 30.31 |
| 3 | M2/TLw | 0.10 | 0.28 | 0.14 | 0.19 | 0.19 | 0.17 |
| 4 | bfwt/f2 | 0.40 | 0.90 | 0.79 | 0.79 | 0.70 | 0.76 |
| 5 | M1/M2 | 0.40 | 1.10 | 0.93 | 0.56 | 0.46 | 0.64 |
| 6 | ν2ap − νd2an | 25 | 50 | 30.54 | 30.13 | 38.59 | 44.15 |
| 7 | νd1p | 14 | 21 | 17.47 | 18.90 | 18.90 | 18.90 |
| 8 | Nd1p | 1.85 | 2.10 | 1.96 | 1.92 | 1.92 | 1.92 |
| 9 | f1g1/f1 | 0.70 | 1.50 | 1.14 | 0.98 | 1.14 | 1.01 |
| 10 | f2ge/f2 | −1.80 | −0.50 | −1.33 | −1.02 | −0.98 | −0.78 |
| 11 | d2G/2GTL | 0.70 | 0.98 | 0.94 | 0.91 | 0.89 | 0.87 |

Each example provides a zoom lens advantageous, for example, to a small size, a large aperture, and a high optical performance in the wavelength range from the visible range to the near infrared range.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-161212, filed on Sep. 4, 2019, which is hereby incorporated by reference herein in its entirety.

What is claimed is:

1. A zoom lens comprising, in order from an object side to an image side, a first lens unit having a negative refractive power and a second lens unit having a positive refractive power, a distance between the first lens unit and the second lens unit changing during zooming,
wherein the second lens unit includes an aperture stop and two or more negative lenses,
wherein the aperture stop is located closest to an object side in the second lens unit, and
wherein following conditional expressions are satisfied:

$$-1.00 < f1/f2 < -0.60$$

$$18 < vd2n < 39$$

$$0.10 < M2/TLw < 0.28$$

$$0.40 < bfwt/f2 < 0.90$$

where f1 is a focal length of the first lens unit, f2 is a focal length of the second lens unit, vd2n is an average of the smallest Abbe number and the second smallest Abbe number in the two or more negative lenses, M2 is an absolute value of a difference between a position of the second lens unit relative to an image plane at a wide-angle end and a position of the second lens unit relative to the image plane at a telephoto end, TLw is an overall length of the zoom lens at the wide-angle end, and bfwt is the shortest air-converted backfocus during zooming from the wide-angle end to the telephoto end.

2. The zoom lens according to claim 1, wherein a following conditional expression is satisfied:

$$0.40 < M1/M2 < 1.10$$

where M1 is a difference between a position of the first lens unit at the wide-angle end and a position of the first lens unit at the telephoto end.

3. The zoom lens according to claim 1, wherein a following conditional expression is satisfied:

$$25 < vd2ap - vd2an < 50$$

where vd2ap is an average of Abbe numbers of all positive lenses included in the second lens unit, and vd2an is an average of Abbe numbers of all negative lenses included in the second lens unit.

4. The zoom lens according to claim 1, wherein the first lens unit includes a positive lens, and wherein following conditional expressions are satisfied:

$$14 < vd1p < 21$$

$$1.85 < Nd1p < 2.10$$

where vd1p is an average of Abbe numbers of all positive lenses included in the first lens unit, and Nd1p is an average of refractive indices of all positive lenses included in the first lens unit.

5. The zoom lens according to claim 1, wherein the first lens unit includes a negative lens, a negative lens, and a positive lens in order from the object side to the image side, and
wherein a following conditional expression is satisfied:

$$0.70 < f1g1/f1 < 1.50$$

where f1g1 is a focal length of the negative lens closest to an object in the first lens unit.

6. The zoom lens according to claim 1, wherein the second lens unit includes a negative meniscus lens closest to an image plane in the second lens unit and having a convex surface facing the image side, and
wherein a following conditional expression is satisfied:

$$-1.80 < f2ge/f2 < -0.50 \qquad (10)$$

where f2ge is a focal length of the negative meniscus lens.

7. The zoom lens according to claim 1, wherein a following conditional expression is satisfied:

$$0.70 < d2G/2GTL < 0.98$$

where d2G is a total central thickness of all lenses included in the second lens unit, and 2GTL is an overall length of the second lens unit.

8. A lens apparatus comprising:
a zoom lens;
a memory; and
a controller electrically connected to the memory and configured to perform controlling zooming of the zoom lens,
wherein the zoom lens includes, in order from an object side to an image side, a first lens unit having a negative refractive power and a second lens unit having a positive refractive power, a distance between the first lens unit and the second lens unit changing during zooming,
wherein the second lens unit includes an aperture stop and two or more negative lenses,
wherein the aperture stop is located closest to an object in the second lens unit, and
wherein following conditional expressions are satisfied:

$$-1.00 < f1/f2 < -0.60$$

$$18 < vd2n < 39$$

$$0.10 < M2/TLw < 0.28$$

$$0.40 < bfwt/f2 < 0.90$$

where f1 is a focal length of the first lens unit, f2 is a focal length of the second lens unit, vd2n is an average of the smallest Abbe number and the second smallest Abbe number in the two or more negative lenses, M2 is an absolute value of a difference between a position of the second lens unit relative to an image plane at a wide-angle end and a position of the second lens unit relative to the image plane at a telephoto end, TLw is an overall length of the zoom lens at the wide-angle end, and bfwt is the shortest air-converted backfocus during zooming from the wide-angle end to the telephoto end.

9. The lens apparatus according to claim 8, wherein the controller is configured to perform generating a control signal for controlling the zooming.

10. The lens apparatus according to claim 9, wherein the controller includes an operation unit operated by a user to generate the control signal.

11. The lens apparatus according to claim 8, comprising a display configured to display information on the zooming.

12. An image pickup apparatus comprising:
a zoom lens of claim 1; and
an image pickup element configured to pick up an image formed by the zoom lens.

13. An image pickup apparatus comprising:
a lens apparatus of claim 8; and
an image pickup element configured to pick up an image formed by the lens apparatus.

* * * * *